(12) United States Patent
Bonnier

(10) Patent No.: US 8,641,405 B2
(45) Date of Patent: Feb. 4, 2014

(54) PISTON FOR POSITIONING A FOOD POT DECORATION IN A MOLD AND ASSOCIATED DEVICE

(75) Inventor: Christophe Bonnier, Saint Brice Sous Foret (FR)

(73) Assignee: A R C I L, Puiseux Pontoise (FR)

( * ) Notice: Subject to any disclaimer, the term of this patent is extended or adjusted under 35 U.S.C. 154(b) by 426 days.

(21) Appl. No.: 12/827,036

(22) Filed: Jun. 30, 2010

(65) Prior Publication Data
US 2011/0001263 A1 Jan. 6, 2011

(30) Foreign Application Priority Data

Jul. 1, 2009 (FR) ...................................... 09 03218

(51) Int. Cl.
*B29C 49/20* (2006.01)
(52) U.S. Cl.
USPC ........... 425/332; 425/112; 425/297; 425/392; 425/393; 425/417
(58) Field of Classification Search
USPC ........... 425/126.1, 127, 289, 292, 304, 305.1, 425/306, 307, 309, 310, 313, 343, 346, 353, 425/355, 383, 391, 394, 395, 398, 400, 412, 425/417, 469, 112, 117, 297, 332, 333, 392, 425/393, 416, 468
See application file for complete search history.

(56) References Cited

U.S. PATENT DOCUMENTS

| | | | | |
|---|---|---|---|---|
| 2,354,564 A | * | 7/1944 | Wiley | 425/398 |
| 3,983,827 A | * | 10/1976 | Meadors | 264/293 |
| 4,025,275 A | * | 5/1977 | Gournelle | 425/387.1 |
| 4,071,598 A | * | 1/1978 | Meadors | 264/295 |
| 4,127,378 A | * | 11/1978 | Meadors | 425/398 |
| 4,149,841 A | * | 4/1979 | Patterson | 425/398 |
| 4,225,553 A | * | 9/1980 | Hirota et al. | 264/292 |
| 4,288,401 A | * | 9/1981 | Keith et al. | 264/550 |
| 4,415,325 A | * | 11/1983 | Fuchs et al. | 425/397 |
| 4,480,979 A | * | 11/1984 | Keith et al. | 425/403 |
| 4,514,353 A | * | 4/1985 | Alexander et al. | 264/294 |
| 4,690,666 A | * | 9/1987 | Alexander et al. | 493/152 |
| 4,961,700 A | * | 10/1990 | Dunbar | 425/394 |
| 5,127,817 A | * | 7/1992 | Weder et al. | 425/383 |
| 5,176,609 A | * | 1/1993 | Weder et al. | 493/154 |
| 5,208,027 A | * | 5/1993 | Weder et al. | 425/188 |
| 5,221,248 A | * | 6/1993 | Weder et al. | 493/133 |
| 5,228,934 A | * | 7/1993 | Weder et al. | 156/227 |
| 5,238,382 A | * | 8/1993 | Weder et al. | 425/150 |
| 5,523,046 A | * | 6/1996 | Weder et al. | 264/522 |
| 5,573,789 A | * | 11/1996 | Weder et al. | 425/394 |
| 5,626,701 A | * | 5/1997 | Weder et al. | 156/227 |
| 6,524,505 B1 | * | 2/2003 | Bisognin et al. | 264/154 |
| 6,524,506 B2 | * | 2/2003 | Spengler | 264/163 |
| 7,695,267 B2 | * | 4/2010 | Dworzan | 425/343 |
| 2002/0121715 A1 | * | 9/2002 | Sandefer et al. | 264/46.4 |
| 2004/0150127 A1 | * | 8/2004 | Sandefer et al. | 264/46.6 |
| 2006/0153943 A1 | * | 7/2006 | Lin | 425/394 |

FOREIGN PATENT DOCUMENTS

DE 27 03 327 8/1977
FR 2 479 738 10/1981

\* cited by examiner

*Primary Examiner* — Seyed Masoud Malekzadeh
(74) *Attorney, Agent, or Firm* — Clark & Brody

(57) ABSTRACT

The invention concerns a piston (1) for positioning a food pot decoration in a mold, a positioning device comprising this piston, and an associated positioning method. The piston (1) comprises at least one means (10) for prefolding or folding the decoration over its full height.

10 Claims, 6 Drawing Sheets

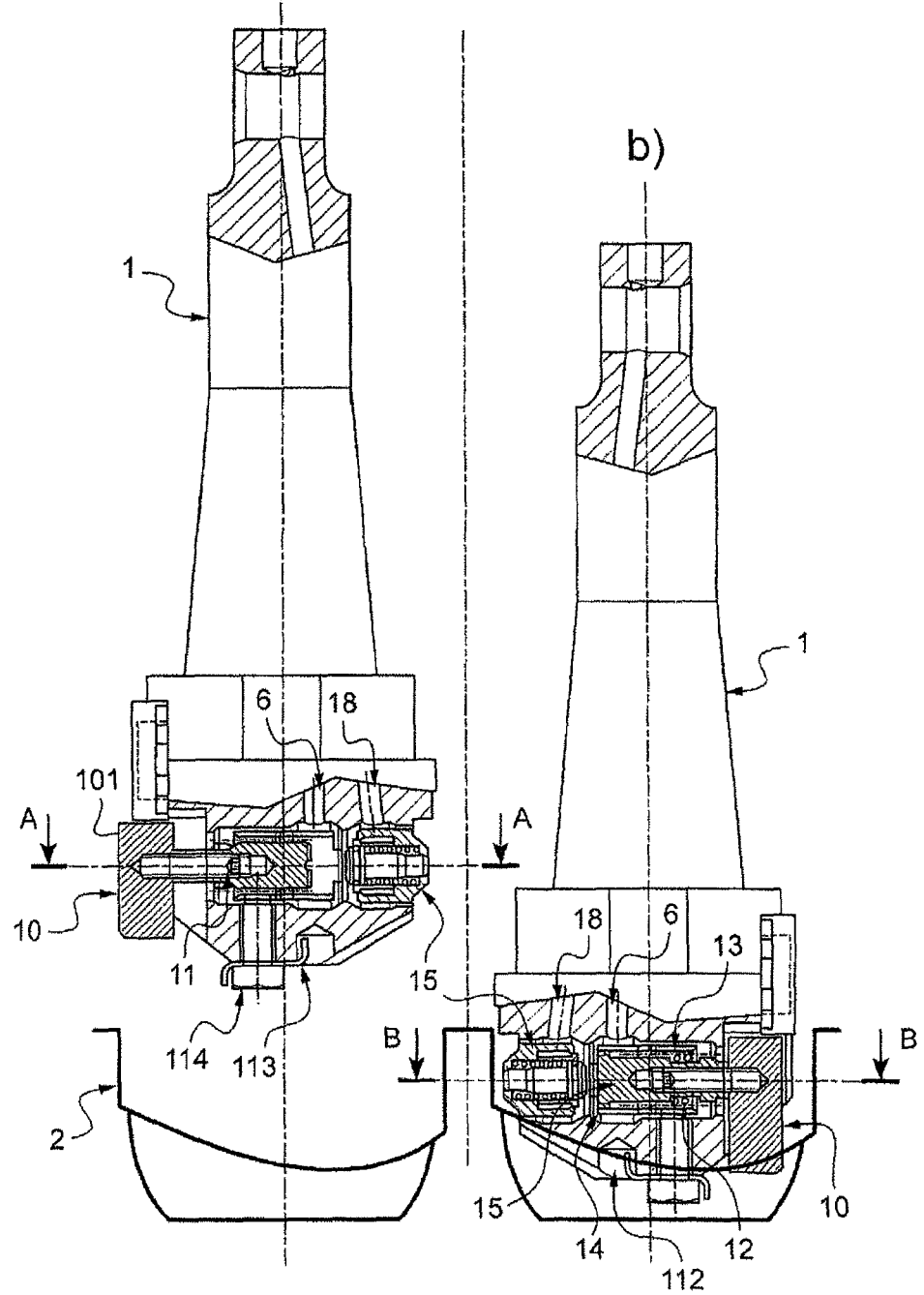

PISTON FOR POSITIONING A FOOD POT DECORATION IN A MOLD AND ASSOCIATED DEVICE

The invention concerns the field of pistons for positioning a food pot decoration in a mold.

These pistons are notably used in machines for thermoforming food pots.

These machines comprise a mold, generally provided with a plurality of cells each adapted to form a food pot. To this end, a decoration is disposed in the cell by means of a positioning piston, then, once the decoration has been positioned in the cell, a preheated plastic material is introduced into the cell that is then pressed against the walls of the cell by blowing. The plastic material is then cooled to form a plastic material food pot the wall of which is provided with a decoration.

A known piston for positioning the decoration in the cell of the mold is represented in FIG. 1. It is represented with one cell 2 of a mold.

It has a free end 100 the exterior dimensions of which are slightly less than the internal dimensions of the food pot mold.

Thus the piston 1 can be introduced without difficulty in a cell 2 on passing from a first position, or high position, to a second position, or low position, and can equally be extracted from the cell 2 without difficulty on passing from the low position to the high position. To pass from the low position to the high position and vice-versa, the piston is moved along its axis A, generally disposed vertically.

In the high position, the piston can receive a decoration around its free end.

After the decoration has been placed around the free end of the piston, a holding finger 15 is used to exert a force on the decoration during the phase of cutting the decoration.

After the decoration is cut, the holding finger 15 is retracted.

The piston 1 then passes from its high position to its low position, carrying the decoration with it.

Once it has arrived in the low position, the free end of the piston is inside the cell. The decoration begins to unroll and is then pressed against the wall of the cell of the mold.

The cell 2 generally has a circumferential edge 21. The decoration is thus pressed onto the edge of the cell, and then remains in place in the cell. The edge prevents the decoration sliding to the bottom of the cell under its own weight.

The decoration then has an area of overlap with itself in which the decoration thickness is doubled.

Whatever the shape of the mold, it is found that in this overlap area part of the decoration departs significantly from the peripheral wall of the cell of the mold.

Moreover, with some molds having shapes with corners, such as a rectangular or square shape, departure of the decoration from the peripheral wall of the cell of the mold is also encountered in the corners of that cell.

This constitutes a problem in that it regularly happens that the positioning of the decoration in the cell is modified or even that the decoration in its entirety moves toward the bottom of the cell despite the presence of the edge when the plastic material to form the food pot is introduced into the cell.

In such a situation, the machine supplies a food pot with badly positioned decoration. The food pot is then unusable commercially.

An objective of the invention is to improve the positioning of the decoration in the cell of the mold to prevent the latter from being moved on introduction of the material to form the food pot.

To this end, the invention proposes a piston for positioning a food pot decoration in a mold, characterized in that it includes at least one means for prefolding or folding the decoration over its full height.

This positioning system can equally have at least one of the following features, separately or in combination:
- an actuating piston movable in a jacket between a rest position and a working position to prefold or fold the decoration, the direction of movement being substantially perpendicular to the axis of the positioning piston;
- a passage for feeding the jacket with fluid to move the actuating piston in the jacket;
- a return means for repositioning the means for prefolding or folding the decoration from a working position to a rest position;
- said at least one means for prefolding the decoration over its full height includes a plurality of punches extending along the axis of the piston;
- the means for folding the decoration over its full height have a sharp edge extending along the axis of the piston;
- a holding finger housed in a jacket, said jacket being produced in two parts, one of these two parts being formed in one piece with the jacket of the actuating piston;
- a plurality of means is provided for prefolding or folding the decoration over its full height, at least two of these means being disposed along the positioning piston at the same height.

The invention also proposes a device for positioning a food pot decoration in a mold, comprising:
- at least one piston for positioning the decoration in the mold;
- means for wrapping the decoration around the piston;
- means for cutting the decoration;

characterized in that the piston comprises at least one means for prefolding or folding the decoration over its full height.

The device may furthermore have one or more of the following features, separately or in combination:
- a slot to receive the means for prefolding or folding the decoration when it effects a prefolding or folding operation;
- the slot is a slot for introducing the decoration around the positioning piston;
- the means for prefolding or folding the decoration is positioned within the piston so that the angle α formed between on the one hand the translation axis of said means and on the other hand the wall of a plate facing the piston is in a range from 60° to 80° inclusive, the angle α being chosen in this range to enable the means for prefolding or folding the decoration to be inserted in the slot.

The invention further proposes a method of positioning a food pot decoration in a mold using a device according to the invention, including a step of prefolding or folding the decoration.

The method may comprise the following series of steps:
- wrapping the decoration around the piston for positioning the decoration in the mold; then
- cutting the decoration, and then after prefolding or folding the decoration;
- positioning the decoration in the mold.

Alternatively, the method may comprise the following series of steps:
- wrapping the decoration around a piston for positioning the decoration in the mold before the folding or prefolding step; then, after the folding or prefolding step;
- cutting the decoration, before finally positioning it in the mold.

The invention will be better understood and other objects, advantages and features thereof will become more clearly apparent on reading the following description given with reference to the appended drawings, in which:

FIG. 2 represents a side view of two pistons for positioning a decoration in a respective mold cell, one of the positions being in its high position in FIG. 2(a) and the other being in its low position in FIG. 2(b);

Figures 1, 6:
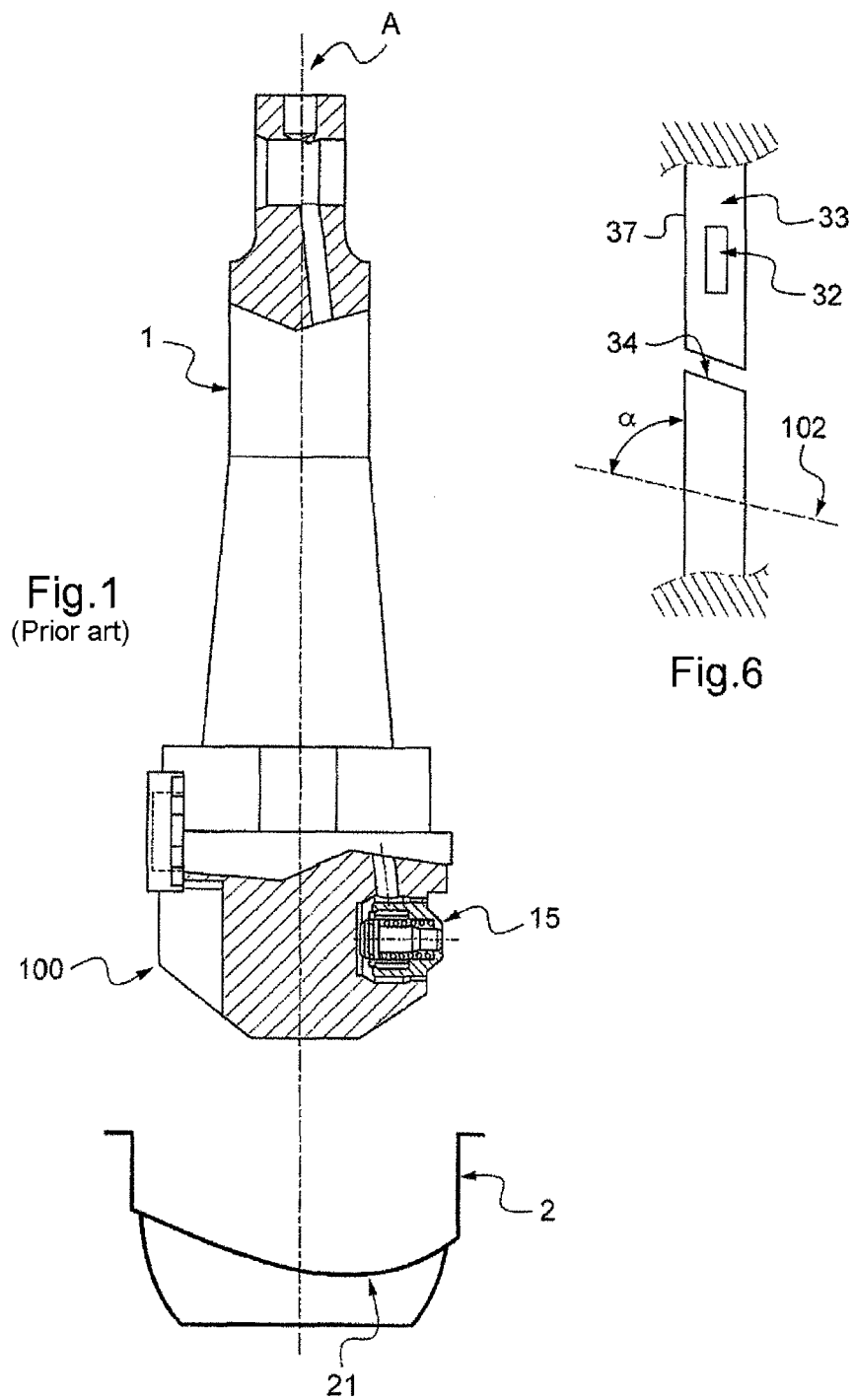
FIG. 1 shows a prior art piston for positioning a decoration in the cell of a mold.
Figure 3:
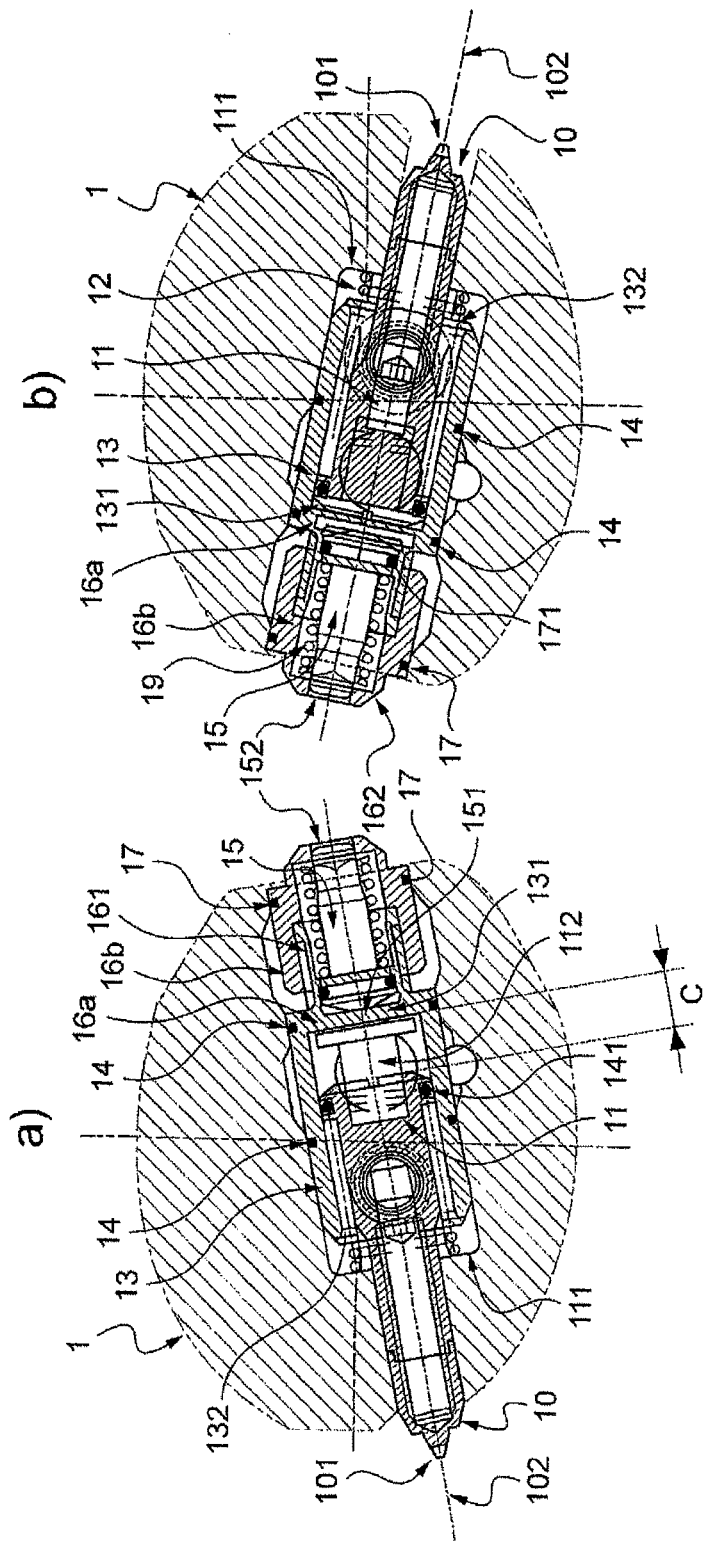
Figure 4A:
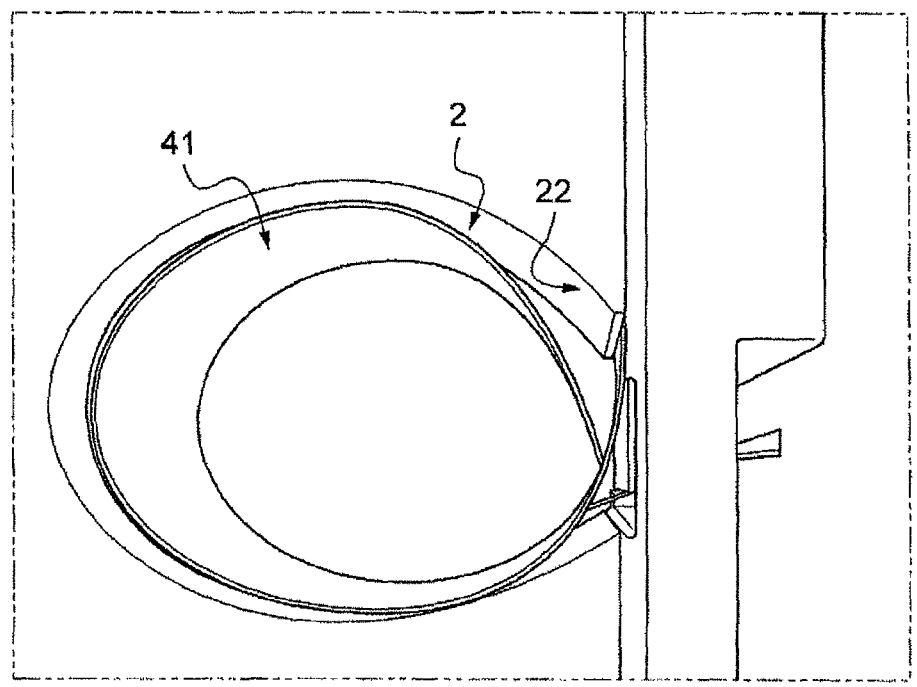
Figure 4B:
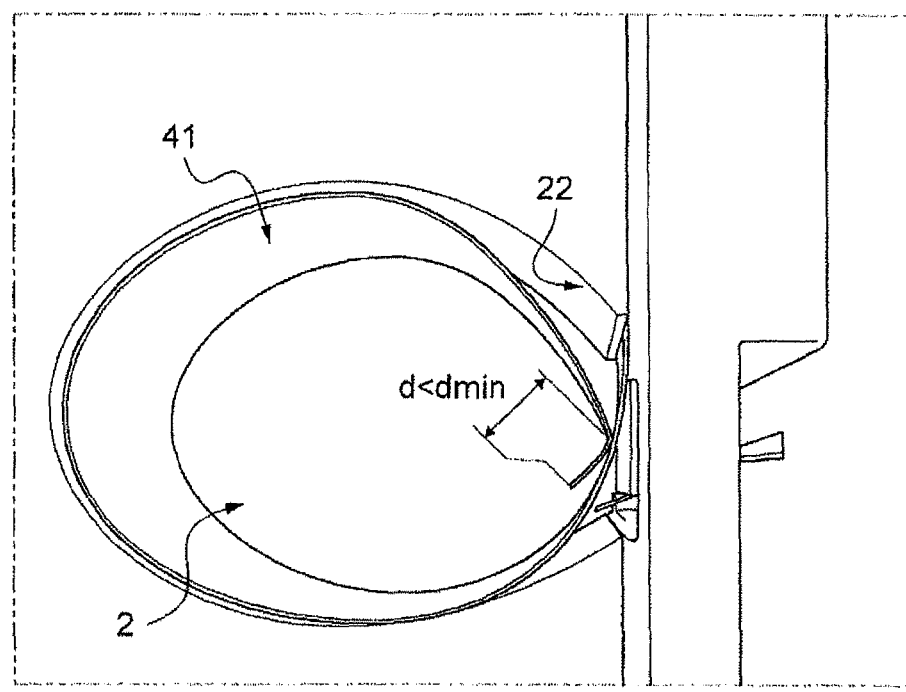
Figure 4C:
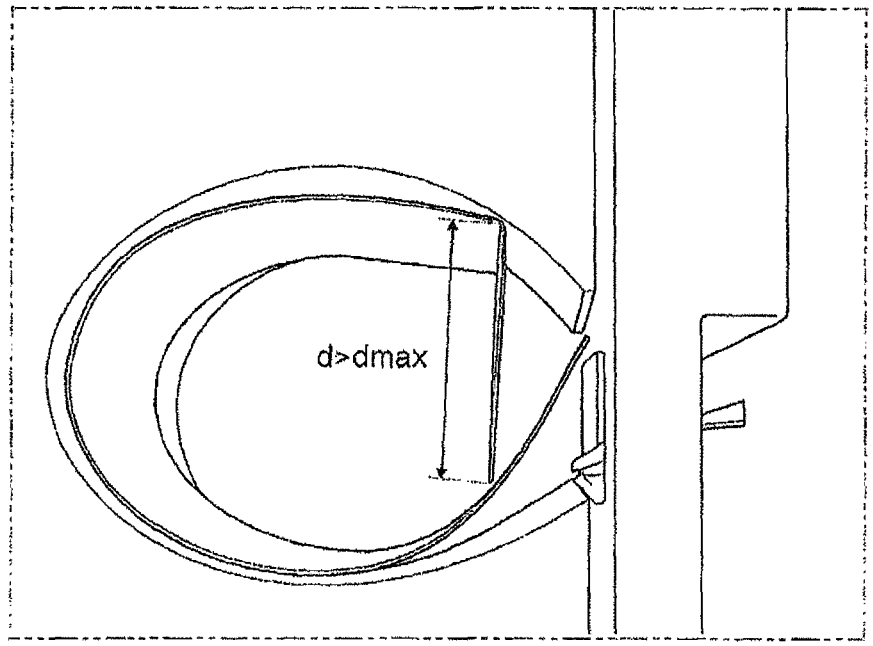
Figure 4D:
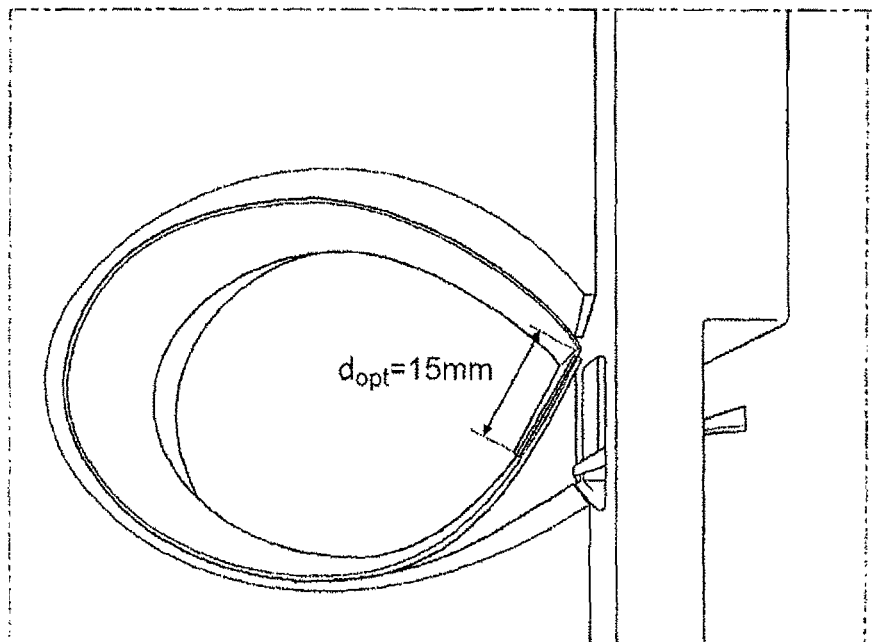
Figure 5:
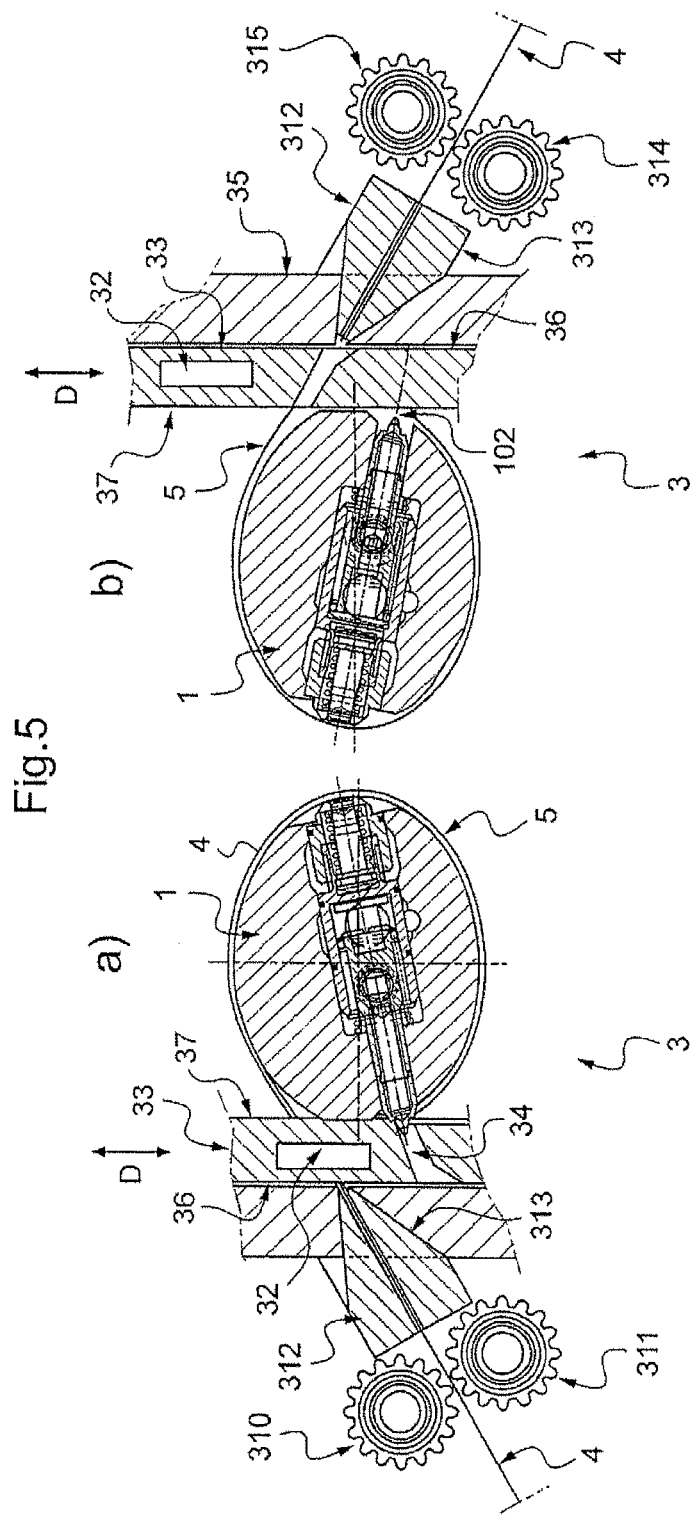

FIG. 3 comprises FIGS. 3(a) and 3(b) representing a section view A-A in FIG. 2(a) and a section view B-B in FIG. 2(b);

FIG. 4 comprises FIGS. 4(a) to 4(d) representing the disposition of a decoration in the mold in the absence of folding in FIG. 4(a), the disposition of a decoration in the mold with folding effected at too small a distance from the edge of the decoration in FIG. 4(b), the disposition of a decoration in the mold with a fold effected at too great a distance from the edge of the decoration in FIG. 4(c), and the disposition of a decoration in the mold with folding effected at an optimum distance from the edge of the decoration in FIG. 4(d);

FIG. 5 comprises FIGS. 5(a) and 5(b) representing a partial sectional view of a device for positioning a food pot decoration in a mold that is provided with pistons conforming to FIGS. 2 and 3, which are represented in their high position, the piston being represented after the unrolling of the decoration in FIG. 5(a) and before unrolling of the decoration in FIG. 5(b);

FIG. 6 is a diagram showing the angle α characterizing the position of a folding finger of the device from FIG. 5(b) relative to that device.

FIG. 2 represents a side view of a piston 1 for positioning a decoration in a mold cell, the piston being in its high position in FIG. 2(a) and in its low position in FIG. 2(b). Between the two positions, the piston effects a movement in translation along the longitudinal axis of the piston.

The piston 1 comprises at least one means 10 for folding the decoration. This means 10 is for example a folding finger as represented in the appended figures. The folding finger 10 has a sharp edge 101 extending its full height.

The folding finger 10 has two extreme positions, one being a rest position and the other being a working position.

The rest position of the folding finger 10 is represented in FIGS. 2(b), 3(b) and 5(b). For its part the working position of the folding finger 10 is represented in FIGS. 2(a), 3(a) and 5(a).

The folding finger 10 and the positioning piston 1 are actuated separately. However, for the piston 1 to function correctly, the folding finger 10 is positioned as a function of the position of the piston 1 as follows.

When the piston 1 is in the high position and a decoration has just been wrapped around the piston 1, the folding finger 10 is in its rest position.

The decoration is then cut as explained hereinafter.

The folding finger 10 is then moved by actuation means 11 into its FIG. 2(a) working position to effect the folding of the decoration.

Once this folding has been effected, the actuation means 11 returns the folding finger 10 to its rest position, the piston 1 being then still in its high position.

The folding finger 10 then remains in its rest position as the piston 1 moves from its high position to its low position and as it rises from its low position to its high position.

A new cycle can then commence.

The actuating means 11, which enables movement of the folding finger 10 from a rest position to a working position and vice versa is for example a piston mounted rigidly on the folding finger 10.

This actuating piston 11 can be moved axially inside a jacket 13 along an axis substantially perpendicular to the axis of movement of the piston 1 between its high and low positions. The movement axis of the piston coincides with its longitudinal axis.

The jacket 13 includes an end wall 131 of the jacket 13 corresponding to the bottom of the jacket 13. Opposite this end wall 131 the jacket 13 includes an opening 132.

The movement of the actuating piston 11 is obtained by pressurizing the jacket 13 via a fluid feed passage 6 discharging into the jacket.

For pressurization to be effective, the jacket 13 must be fluid-tight. This fluid-tightness is notably obtained by using a jacket 13 the wall of which is lined and by the presence of an O-ring seal 141. This O-ring seal 141 is disposed between the jacket 13 and the actuating piston 11 to prevent fluid fed via the feed passage 6 escaping from the jacket 13 into an interior volume of the positioning piston 1.

This fluid-tightness is also obtained by other seals 14 disposed between the external wall of the jacket 13 and the internal wall of the piston 1. Accordingly, if the O-ring seal 141 is missing, the seals 14 provide a seal between the positioning piston 1 and the jacket 13.

The actuating piston 11 is then moved in the jacket 13 only from the moment at which the fluid pressure exerted on the active area of the actuating piston 11 exceeds a return force exerted on the actuating piston 11 by a return means 12 also housed in the jacket 13.

The piston 1 includes a return means 12 that is for example a return coil spring housed between a wall of the actuating piston 11 and the internal wall 111 of the positioning piston 1 facing the actuating piston 11.

In the rest position of the folding finger 10 shown in FIGS. 2(b) and 3(b), no fluid is fed into the jacket 13. In this position, the actuating piston 11 is held at the bottom of the jacket 13 by the action of the return force exerted by the spring 12. Thus the spring 12 holds the actuating piston 11 in contact with the end wall 131 of the jacket 13.

In the working position of the folding finger 10, fluid is fed into the jacket 13 at a pressure sufficient to move the actuating piston 11, which is then no longer held at the bottom of the jacket, as represented in FIGS. 2(a) and 3(a).

By working position is meant the position of the folding finger 10 in which it can fold a decoration.

The travel C of the actuating piston 11, represented in FIG. 3(a), between the rest and working positions of the folding finger 10 is generally less than 10 mm and preferably around 7 mm.

Alternatively, there could be provision for the actuating piston 11 to be moved by electrical rather than fluid means. Similarly, there could be provision for the return means 12 to function magnetically, electrically, pneumatically or hydraulically.

It will be noted that the element 112 from FIG. 3 corresponds to the spot facing in FIG. 2(b), which makes it possible to accept a washer 113 for the retaining screw 114.

The piston 1 also includes a finger 15 for holding the decoration.

This holding finger 15 is represented in its rest position in all the appended drawings.

The holding finger 15 and the piston 1 for positioning the decoration in the mold are actuated separately. Nevertheless, for the piston 1 to function correctly, the holding finger 15 is positioned as a function of the position of the piston 1 as follows.

When the piston 1 is in the high position and a decoration has just been wrapped around the piston 1 the holding finger 15 is in its FIG. 2(a) rest position.

The holding finger 15 is then moved toward its working position to hold the decoration in position relative to the piston 1.

The decoration is then cut.

The holding finger 15 is then returned to its rest position with the decoration disposed around the free end of the piston 1.

The holding finger 15 then remains in its rest position as the piston 1 moves from its high position to its low position, as represented in FIG. 2(b).

The decoration is then placed in the mold, the holding finger remaining in its rest position.

This rest position is retained throughout the raising of the piston 1 to its high position.

A new cycle can then commence.

The holding finger 15 is housed in a jacket 16 that is produced in two parts 16a, 16b of the male/female type screwed together in the area 161.

In operation, the end 152 of the holding finger 15 emerges from the positioning piston 1 (not shown).

In contrast, at rest, the holding finger 15 is inside the piston 1. To be more precise, one face of one end 151 of the holding finger is in contact with the wall 131. The other face of the wall 131 can equally be in contact with the folding finger 10.

One part 16a of the two parts 16a, 16b of the jacket 16 is formed by a cylindrical cavity the walls of which are produced in one piece with the jacket 13 of the actuating piston 11. The bottom of the part 16a of the jacket 16 corresponds to the wall 131 against which the holding finger 15 is held in the rest position.

Two independent jackets 13 and 16 could be envisaged. However, the design with a wall common to the two jackets 13, 16 is compact and of relatively low cost.

The other part 16b of the jacket 16 includes a plug 162 projecting out of the positioning piston 1.

The holding finger 15 is moved by pressurizing the jacket 16. For the pressurization to be effective, the jacket 16 must be fluid-tight. This fluid-tightness is obtained notably by the presence of an O-ring seal 171 disposed between the holding finger 15 and the jacket 16. This seal 171 therefore prevents passage of fluid between the jacket 16 and the internal volume of the positioning piston 1.

Other seals 17 are also provided between the external wall of the jacket 16 and the piston body 1.

To pressurize the jacket 16, the piston 1 includes another fluid feed passage 18 that is dedicated to the holding finger 15. The passage 18 is therefore independent of the passage 6 for feeding fluid to the actuating piston 11.

The holding finger 15 is then moved in the jacket 16 only from the moment that the fluid pressure exerted on the active area of the holding finger 15 exceeds a return force exerted on the holding finger 15 by return means 19 also housed in the jacket 16.

The piston 1 includes another return means 19 that is for example a return spring between a wall of the holding finger 15 and the plug 162 of the jacket 16.

In the rest position of the holding finger 15, no fluid is fed into the jacket 16. In this position, the retaining finger 15 is held at the bottom of the jacket 16, i.e. against the wall 131, by the action of the return force exerted by the spring 19.

In the working position of the holding finger 15, fluid is fed into the jacket 16 at a pressure sufficient to move the holding finger 15. The holding finger 15 is then no longer held at the bottom of the jacket and this makes it possible to exert a retaining force on the decoration so that the latter does not slide along the piston 1 during cutting of the decoration.

To fold the decoration effectively, the sharp edge 101 of the folding finger 10 has a height greater than or equal to that of the decoration to be folded. The sharp edge 101 preferably extends the whole height of the folding finger 10.

The folding effected by the folding finger 10 can be effected at a distance from an end of the decoration that is predetermined as a function of various parameters. Those parameters are the shape and the nature of the mold into which the decoration is to be placed, the weight per unit area and the nature of the decoration, and the intended location of the overlap area of the decoration relative to the mold.

An example of folding using the folding finger 10 of the invention is described in detail hereinafter.

EXAMPLE

The mold used has cells of substantially elliptical shape in order to form a polystyrene pot of elliptical shape.

The decoration employed is produced in waxed paper and its weight per unit area is 90 g/m$^2$.

The overlap area of the decoration is on the major axis of the food pot. Using this location, the overlap area is not visible to the consumer.

To this end, the decoration is introduced into a cell of the mold so that the major axis of the cell passes through the area of overlap of the decoration. This is the case in FIGS. 4(a) to 4(d), for example, in which the cell represented is identical from one figure to another.

FIG. 4(a) represents the disposition of a decoration 41 in the mold without folding it, as in the prior art. It can be seen that part of the paper decoration departs significantly from the internal wall 22 of the cell. This problem is all the greater in that, the major axis of the cell passing through the area of overlap of the decoration, that area of overlap is situated on the part of the cell with the greatest curvature.

For their part FIGS. 4(b) to 4(d) represent folding effected at different distances from the end of the decoration. It has been found that there exists a range of optimum distances for which, in the area of overlap of the mold, folding moves the decoration closer to the wall of the mold than a decoration that has not been folded.

A distance $d_{opt}$ in this range $[d_{min}; d_{max}]$ of optimum distances is represented in FIG. 4(d), for example. In the example considered here, $d_{min}=13$ mm and $d_{max}=17$ mm and the optimum distance represented in FIG. 4(d) has the value $d_{opt}=15$ mm. Note that in this FIG. 4(d) the area of overlap of the decoration 41 is close to the wall 22 of the cell, with the result that the decoration overlaps itself.

Incidentally, and as represented in FIG. 4(d), the fold at the optimum distance $d_{opt}$ of a first end of the decoration is situated in the vicinity of the second end of the decoration.

On the other hand, FIGS. 4(b) and 4(c) respectively represent a distance that is too small $d<d_{min}$ and a distance that is too great $d>d_{max}$. Note that in contrast in these FIGS. 4(b) and 4(c) part of the decoration 41 remains at a distance from the wall 22 of the cell over part of the peripheral wall of the mold.

Given the various parameters to be taken into account depending on the application concerned, the person skilled in the art will understand that the range of optimum distance values referred to above may be determined by effecting successive tests.

For effecting the folding, the invention provides a positioning device including the positioning pistons 1 represented in FIG. 2, for example.

This device for positioning a food pot decoration in a mold is represented in part-sectional view in FIGS. 5(*a*) and 5(*b*).

The device 3 includes pistons 1 like those described with reference to FIGS. 2 and 3.

The positioning device 3 includes a plurality of pistons 1 for positioning the decoration in the mold, means 31 for wrapping the decoration around each piston 1 and means 32 for cutting the decoration.

The means 5 for wrapping the decoration around the piston and the means 32 for cutting the decoration are active when the positioning piston 1 is in its high position.

The decoration is fed to the piston 1 in the form of a band 4 moving between two smooth rollers 314, 315 actuated by two corresponding toothed wheels 310, 311 above the rollers 314, 315. At the exit from the smooth rollers 314, 315, the band 4 is guided toward the piston 1 by jaws 312, 313 oriented so that the decoration reaches the peripheral external wall of the piston 1 tangentially.

The wrapping of the decoration around the piston 1 is effected by a conformator 5 of the piston 1 which forces the band 4 to conform to the external peripheral wall of the piston 1. The decorative band is introduced between the external wall of the piston 1 and the internal wall of the conformator 5.

The means 32 for cutting the decoration delimit a length of band determined so that the decoration surrounds the piston 1 with an area of overlap of the decoration on itself.

The means 32 can be cutters disposed inside a cutter-support plate 33.

This plate 33 is disposed between a chassis element 35 of the device and the conformator 5 of the piston 1. The chassis element 35 the plate 33 are parallel and extend against each other.

The cutters are situated at the proximity of the band 4, however, and the plate 33 is adapted to move in translation to come into contact with the band 4 and effect the cut.

This movement in translation is effected in a direction that is parallel to the plane 36 of contact between the chassis element 35 and the plate 33 and perpendicular to the translation axis of the positioning piston 1. This direction is represented by the arrow D in FIGS. 5(*a*) and 5(*b*).

The plate 33 also includes a slot 34 for introducing the decoration around the positioning piston 1. It also serves as a bearing surface for the end of the decoration when the latter has been wound around the positioning piston 1.

The folding finger 10 uses decoration introduction slot 34 to effect the folding. In this case, the travel of the folding finger 10 is not limited by the presence of the plate 33. The presence of the slot for introducing the decoration 34 thus makes it possible to make the folding of the decoration more effective.

To ensure that the folding of the decoration is effected in the range of optimum distances $[d_{min}; d_{max}]$, the subsequent operations are carried out using the device represented in FIG. 5.

First the rate of wrapping of the decoration around the positioning piston 1 is adjusted.

The rate of wrapping of the decoration around the piston is defined by the peripheral part of the positioning piston that is surrounded by the decoration. It is strictly greater than unity to obtain an area of overlap of the decoration.

Once this rate of wrapping has been determined, attempts at positioning the folding finger 10 relative to the decoration are effected.

To this end, the angle α formed between the wall 37 of the plate 33 facing the piston 1 and the translation axis 102 of the folding piston 10 is set to a first value and it is determined if the distance between the end of the decoration and the folding area makes it possible to achieve the required objective, and so on for different values of the angle α. The angle α is shown diagrammatically in FIG. 6, corresponding to part of FIG. 5(*b*).

The folding finger 10 has thus been installed in the positioning piston 1 at different angles α.

Tests have shown that the angle α must be included in the range of angles $[\alpha_{min}; \alpha_{max}]=[60°; 80°]$ to obtain the range of optimum distances $[d_{min}; d_{max}]=[13\text{ mm}; 17\text{ mm}]$. In particular, the angle value α=70° corresponds to the distance $d_{opt}$=15 mm represented in FIG. 4(*d*).

The range of angles α defined in this way also makes it possible to align the displacement axis 102 of the folding finger 10 with the slot 34.

The optimum distance $d_{opt}$ determined in this way is retained for the yogurt pot production operations. End of the example.

The tests carried out to determine the range of optimum distances could be effected differently.

The above example exploits the slot 34 for introducing the decoration for folding.

Nevertheless, providing another slot (not shown) intended to receive the folding finger 10 in the plate or in the wall of the conformator 5 may be envisaged. In this case, the slot 34 serves only for the introduction of the decoration around the piston 1.

As a function of the position of the slot, there may be provision for the angle α to lie within a range of values between 60° and 120° inclusive.

This variant is of benefit even though it uses an additional slot. Note that the range between 60° and 120° inclusive is centered on a right angle. Now, the closer to a right angle the angle between the displacement axis 102 of the folding finger 10 and the decoration disposed against the plate 33, the better the quality of folding.

Moreover, to determine the range of optimum distances, the device represented in FIG. 5 could use a constant angle α for all the tests and the rate of wrapping the decoration around the positioning piston 1 varied from one test to another.

The following steps are effected to position the decoration in a cell of the mold of the invention using the device represented in FIG. 5:

(a) The band 4 of decoration is wrapped around the piston 1.

To this end, the plate 33 must be positioned so that the slot 34 is in alignment with the jaws 312, 313. Following this wrapping, the end of the decoration is pressed against the plate 33 and the piston, the rest of the decoration extending around the positioning piston 1, as represented in FIG. 5(*b*).

(b) The holding finger 15 is placed in its working position so that it holds the decoration.

(c) The decoration is cut by moving the cutter-support plate 33 in translation in order for the cutters 32 to cut the band of decoration.

(d) The decoration is folded by the folding finger 10.

To this end, the folding finger 10 uses the decoration introduction slot 34. Following this step, the device is in the position represented in FIG. 5(*a*).

(e) The holding finger 15 and the folding finger 10 are moved into their respective rest positions.

(f) Finally, the decoration is placed in the mold by causing the piston 1 to move from its high position to its low position.

Alternatively, it is possible to provide for the folding step to be effected between the step of introducing the decoration around the mold and the cutting step.

Alternatively, the slot 34 could have a sharpened edge for cutting the decorative band. In this case, the means for cutting the decoration are formed by this sharp edge and the cutters described above are no longer necessary.

The steps referred to above are generic and can be applied to any embodiment of the invention.

Moreover, the folding finger 10 described above has a sharp edge 101 extending over a height making it possible to cover the height of the decoration and thus to fold the decoration over its full height.

Alternatively, it is nevertheless possible to envisage a folding finger 10 featuring a plurality of punches extending along the axis of the piston. This makes it possible not to fold the decoration over its height but to pre-fold the decoration by creating a series of point defects on the surface of the decoration, this series of defects forming a line of weakness. As a function of the force applied by the punches, the latter can go as far as locally piercing the surface of the decoration. In this variant, the actual folding of the decoration is effected during placement of the decoration in the cell of the mold; because of its non-plane conformation, the latter imparts a stress to the decoration causing it to fold along its line of weakness.

Moreover, in all of the foregoing description, the mold features rounded cells, for example elliptical cells.

However, the cells could have a rectangular or square shape. In this case, the problem of the distance of the decoration away from the wall of the mold arises at the corners of the mold. It then suffices to produce the folds so that the folded areas of the decoration can subsequently be installed at the corners of the mold.

To this end, it is possible to employ a device 3 of the invention whose positioning piston 1 comprises four folding fingers of the same type as the folding finger 10 described above distributed around the axis A of the piston for positioning the decoration.

Thus if the pot in which the decoration is to be installed is square, four folding fingers at right angles to each other are distributed uniformly around the axis A of the piston for positioning the decoration.

For pots having sharp corners (square, rectangular or other shape pots), the places where the folds must be produced correspond to the four corners of the cell of the mold, which are easily identifiable. The preliminary tests for determining a range of optimum distances between the end of the decoration and the folding area are therefore simply aimed at refining the position of the fold relative to the end of the decoration.

Each chamber of a folding finger can be fed by its own fluid feed passage. All the chambers associated with each of the folding fingers can nevertheless be fed by a common feed channel to actuate the four folding fingers 10 at the same time.

On the other hand, only one holding finger is necessary, which may be disposed on the perimeter of the positioning piston between two folding fingers.

Alternatively, the holding finger may be disposed on a different side to the four folding fingers along the positioning piston.

Alternatively, and for reasons of overall size, disposing two folding fingers at a first height of the positioning piston and disposing the other two folding fingers at a second height of the positioning piston may be envisaged. In this case, the folding fingers installed at the same height are preferably in diametrically opposite positions.

The number of folding fingers is adapted to the shape of the pot in which the decoration is intended to be positioned. For example, there are hexagonal pots for which it is preferable to provide six folding fingers. The latter are preferably disposed at a plurality of heights for reasons of overall size linked to the limited internal volume of the positioning piston.

Once again, each folding finger 10 may provide a sharp edge 101 for effecting a fold over the full height of the decoration or a plurality of punches for effecting pre-folding, the corners of the cell then making it possible to effect the folding when the decoration is disposed therein.

The invention claimed is:

1. Device (3) for positioning a food pot decoration in a mold, comprising:
   at least one piston (1) for positioning the decoration in the mold;
   a conformator (5) for wrapping the decoration around the at least one piston (1);
   a plate (33) comprising cutters (32) for cutting the decoration, said plate (33) being arranged between said conformator (5) and said at least one positioning piston (1);
   at least one folding finger (10) to prefold or fold the decoration over a full height of the decoration, said at least one folding finger (10) being movable within the positioning piston (1) between a rest position and a working position, along a direction of movement which is substantially perpendicular to an axis of the at least one positioning piston (1);
   an angle α formed between a translation axis (102) of the at least one folding finger (10) and a wall (37) of the plate (33) facing the at least one positioning piston (1) being between 60° and 120° inclusive, such that said at least one folding finger (10) is capable of being inserted in a slot (34) provided in said plate (33).

2. Device according to claim 1 for positioning a food pot decoration in a mold, wherein the slot (34) configured for introducing the decoration around the positioning piston (1).

3. Device according to claim 2 for positioning a food pot decoration in a mold, wherein the at least one folding finger (10) for prefolding or folding the decoration is positioned within the at least one piston (1) so that the angle a formed between on the one hand the translation axis (102) of said at least one folding finger (10) and on the other hand the wall (37) of a plate (33) facing the at least one piston (1) is in a range from 60° to 80° inclusive, the angle α being chosen in this range to enable the at least one folding finger (10) for prefolding or folding the decoration to be inserted in the slot (34).

4. The device according to claim 1, wherein said at least one folding finger (10) is mounted on an actuating piston (11) movable in a jacket (13) between the rest position and the working position.

5. The device according to claim 4, wherein there is further provided a passage (6) for feeding the jacket (13) with fluid to move the actuating piston (11) in the jacket (13).

6. The device according to claim 1, wherein there is provided a return means (12) for repositioning the at least one folding finger (10) for prefolding or folding the decoration from the working position to the rest position.

7. The device according to claim 1, wherein said at least one folding finger (10) for prefolding the decoration over the full height thereof includes a plurality of punches extending along the axis of the at least one piston.

8. The device according to claim 1, wherein the folding finger (10) for folding the decoration over the full height thereof has a sharp edge extending along the axis of the at least one piston.

9. The device according to claim 4, wherein there is provided a holding finger (15) housed in a jacket (16), said jacket (16) being produced in two parts (16a, 16b), one part (16a) of the two parts being formed in one piece with the jacket (13) of the actuating piston (11).

10. The device according to claim 1, wherein a plurality of folding finger (10) are provided for prefolding or folding the decoration over the full height thereof, at least two of the folding fingers being disposed along the at least one positioning piston (1) at the same height.

* * * * *